US012748619B1

(12) United States Patent
Park

(10) Patent No.: US 12,748,619 B1
(45) Date of Patent: Sep. 29, 2026

(54) SYSTEM AND METHOD FOR OPPORTUNISTIC THREAD-SWITCHING FOR FASTER TASK-SWITCHING FOR HANDLING INTERRUPTS AND SUBROUTINES

(71) Applicant: CEREMORPHIC, INC., San Jose, CA (US)

(72) Inventor: Heonchul Park, Pleasanton, CA (US)

(73) Assignee: Ceremorphic, Inc., San Jose, CA (US)

( * ) Notice: Subject to any disclaimer, the term of this patent is extended or adjusted under 35 U.S.C. 154(b) by 841 days.

(21) Appl. No.: 17/953,596

(22) Filed: Sep. 27, 2022

(51) Int. Cl.
*G06F 9/48* (2006.01)

(52) U.S. Cl.
CPC .......... *G06F 9/4818* (2013.01); *G06F 9/4881* (2013.01)

(58) Field of Classification Search
CPC ............................ G06F 9/4818; G06F 9/4881
See application file for complete search history.

(56) References Cited

U.S. PATENT DOCUMENTS 7,805,573 B1 * 9/2010 Coon .................. G06F 12/0842 712/228
2013/0080749 A1 * 3/2013 Ito ......................... G06F 9/3848 712/240
2015/0095614 A1 * 4/2015 Toll ....................... G06F 9/3824 712/42
2017/0039093 A1 * 2/2017 Lin ....................... G06F 9/5083
2018/0089007 A1 * 3/2018 Gottschlich ........... G06F 11/073
2018/0260360 A1 * 9/2018 Samadi .................. H10D 88/00
2019/0129489 A1 * 5/2019 Mednick ............... G06F 1/3287
2021/0096856 A1 * 4/2021 Tsirkin .................... G06F 9/522
2021/0124626 A1 * 4/2021 Manula ..................... G06F 9/52

* cited by examiner

*Primary Examiner* — Michael W Ayers
(74) *Attorney, Agent, or Firm* — File-EE-Patents.com; Jay A. Chesavage

(57) ABSTRACT

A computing device includes (a) circuitry for managing at least (1) a first thread and (2) a second thread, (b) circuitry for causing the first thread to initiate or receive a priority task, (c) circuitry for determining a status of the second thread, (c) circuitry for, responsive to the second thread having an idle status, copying at least some state associated with the first thread to registers of the second thread, activating the second thread, and changing its availability status from idle to active; (d) circuitry for at least one of concurrently or simultaneously: (1) copying the at least some state from the registers of the second thread to a stack; and (2) performing the priority task at least in part with the first thread; and (e) circuitry for, upon completion of the copying, deactivating the second thread and changing its availability status to idle.

20 Claims, 10 Drawing Sheets

SYSTEM AND METHOD FOR OPPORTUNISTIC THREAD-SWITCHING FOR FASTER TASK-SWITCHING FOR HANDLING INTERRUPTS AND SUBROUTINES

FIELD OF TECHNOLOGY

Some embodiments pertain to systems and methods for opportunistic thread-switching in a multi-threaded computing environment. In particular, some embodiments pertain to systems and methods for opportunistic thread-switching in a multi-threaded computing environment for faster task-switching for handling of at least interrupts and subroutines.

BACKGROUND

Computers typically use one or more processors to execute programs. A processor may have a single core or multiple cores. A processor with multiple cores may be referred to as a multi-core processor. Multiple cores allow for parallel and/or concurrent execution. A core may include one or more processes. A process may include one or more threads. A thread is a sequential flow of execution.

A processor that is configured for parallel multi-thread execution may be referred to as a multi-threaded processor. A multi-core multi-threaded processor has multiple cores and can execute multiple threads.

A thread typically has resources such as program code, registers, and access to memory. Some of these resources may be exclusive of other threads, such as some registers. Other resources are shared with other threads, such as access to memory and program code.

Threads often switch from performing a task to performing a different task. For example, a thread may switch from performing a first task to performing a second task. And then the thread may switch from performing the second task back to performing the first task.

Each task performed by a thread is associated with its own context. For example, a context may include a program counter which is a register that contains the memory address of the next instruction to be executed. Other registers are typically part of that context. This context may also include data, such as the values of various variables. When a thread switches from performing a first task to performing a different task, the context associated with the first task must be preserved by being stored to a stack associated with that first thread.

Storing the current context to a stack is a time-intensive operation. For example, if a thread switches from executing a first task to executing a second task, it must first save the context for that first task to a thread stack. In many systems, the execution of the second task may not begin until the context associated with the first task has been saved to the stack. This delay may be referred to as context-switch delay.

In one scenario, a thread performs a first task that may be a user program and receives a system interrupt. The thread must then run a second task (e.g., an interrupt handler). But before the thread may execute the interrupt handler, it must save the context of the first task, including current task information, by saving it to its stack.

In a second scenario, while performing a task, a thread needs to call a subroutine. But before the thread may execute the subroutine, it must save some context to the stack.

SUMMARY

In some embodiments a computing device includes at least a multi-threaded processor that is configured to execute a plurality of threads. The computing device includes at least thread management circuitry configured for managing the plurality of threads, the plurality of threads including at least (1) a first thread and (2) a second thread.

The computing device further includes at least a priority task circuitry configured for causing the first thread to at least one of initiate or receive a priority task.

The computing device further includes at least an availability status determination circuitry configured for, responsive to the priority task, determining an availability status of the second thread.

The computing device further includes at least a context save circuitry configured for, responsive to a determination that the second thread availability status is idle, copying at least some state associated with the first thread to one or more registers associated with the second thread, activating the second thread, and changing the availability status of the second thread from idle to active.

The computing device further includes at least a parallel execution circuitry configured for at least partly performing the following tasks at least one of concurrently or simultaneously: (1) copying the at least some state from the one or more registers associated with the second thread to a stack in memory; and (2) performing the priority task at least in part with the first thread.

And the computing device further includes at least a deactivation circuitry configured for, responsive to completion of the copying the at least some state from the one or more registers associated with the second thread to a stack in memory, deactivating the second thread and changing the availability status of the second thread to idle.

BRIEF DESCRIPTION OF THE DRAWINGS

Representative embodiments are illustrated by way of example and not by limitation in the accompanying figures, in which.

DETAILED DESCRIPTION

Figure 1:
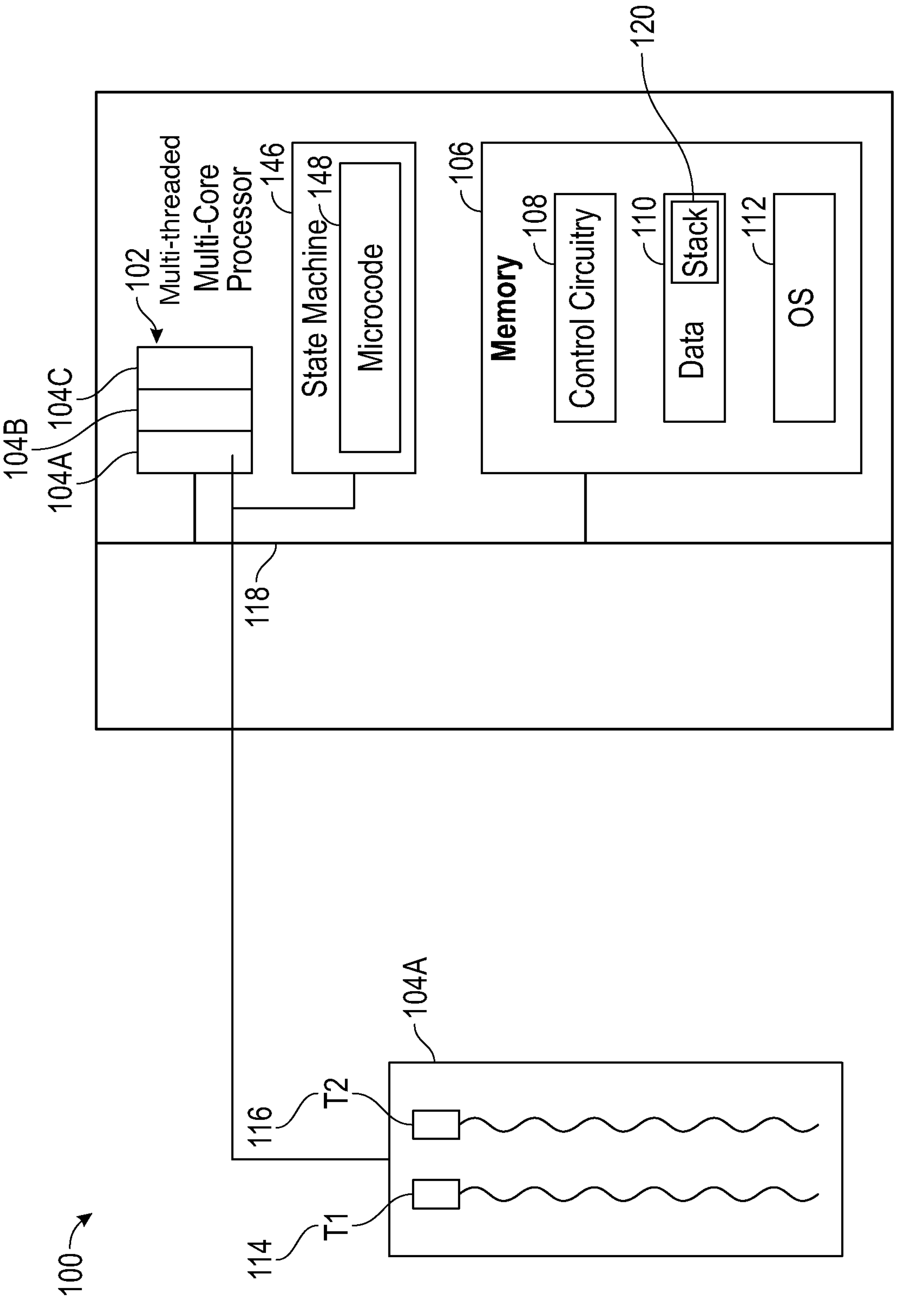
FIG. 1 is a simplified block diagram of an exemplary computing device in which some embodiments may be practiced, showing a multi-threaded, multi-core processor and other components.

In the above-described drawing, certain features are simplified to avoid obscuring the pertinent features with extraneous details. For example, an actual embodiment may have a greater number of certain elements, but a fewer number of such elements are shown to avoid clutter and to promote understanding. The above drawings are not necessarily to scale.

It is to be understood that the disclosed embodiments are merely exemplary of the invention, which may be embodied in various forms. It is also to be understood that multiple references to "some embodiments" are not necessarily referring to the same embodiments.

Context-switching causes delay when a thread must transition from executing a first task (e.g., a user program) to executing a second task (e.g., an interrupt handler, a subroutine, etc.). This delay arises from the need to save the state of the first task to a stack. Accessing a stack for store operations is magnitudes slower than accessing memory located within a processor, such as for example, registers and cache memory.

Thus, there is a need for systems and methods for transitioning a thread between a first task and a second task without the delay of saving the state of the first task to a stack. Such systems and methods would provide faster throughput and improved computing relative to traditional systems and methods.

Some embodiments provide one or more solutions to the above problem by taking advantage of resources in a multi-threaded environment. More specifically, some embodiments provide one or more solutions in a multi-threaded environment by making registers of an idle thread available for temporarily saving (e.g., storing) state of an active thread that is changing tasks. The active thread is thus able to switch from a first task to a second task after transferring its state to registers of the second thread. Transferring state to the registers of the idle second thread is considerably faster than saving the state to the stack in memory. The active thread can then more quickly move to the second task and the formerly idle second thread (now an employed thread) handles the storing of first thread's state to the stack. The throughput of the computer is improved (e.g., sped up).

Thus, in some embodiments, a computing device includes at least a multi-threaded processor that is configured to execute a plurality of threads. The computing device includes at least thread management circuitry configured for managing the plurality of threads, the plurality of threads including at least (1) a first thread and (2) a second thread. The computing device further includes at least priority task circuitry configured for causing the first thread to at least one of initiate or receive a priority task. The computing device further includes at least availability status determination circuitry configured for, responsive to the priority task, determining an availability status of the second thread. The computing device further includes at least context save circuitry configured for, responsive to a determination that the second thread availability status is idle, copying at least some state associated with the first thread to one or more registers associated with the second thread, activating the second thread, and changing the availability status of the second thread from idle to active. The computing device further includes at least parallel execution circuitry for at least partly performing the following tasks at least one of concurrently or simultaneously: (1) copying the at least some state from the one or more registers associated with the second thread to a stack in memory; and (2) performing the priority task at least in part with the first thread. And the computing device further includes at least circuitry configured for, responsive to completion of the copying the at least some state from the one or more registers associated with the second thread to a stack in memory, deactivating the second thread and changing the availability status of the second thread to idle.

As used in this document, the term "active thread" is used to denote at least a thread that has a status of active—for example, being actively engaged in executing a program, a routine, or task. In some embodiments, an active thread is a thread that is indicated as active in a register, such as by one or more status bits, or in a data structure.

As used in this document, the term "idle thread" is used to denote at least a thread that has a status of idle—for example, not actively engaged in executing a program, a routine, or task. In some embodiments, an idle thread is a thread that is indicated as idle in a register, such as by one or more status bits, or in a data structure.

As used in this document, the term "main thread" is used to denote at least a thread of a plurality of threads that is active and that is at least attempting enlist an idle thread to store its state.

As used in this document, the term "employed thread" is used to denote at least a thread that has transitioned from an idle status and is at least one of: (1) receiving the state of another thread, or (2) copying the state of another thread to a stack.

As used in this document, the term "state" is used to denote at least the state of a thread. In some embodiments, state includes at least one of a program counter, a control status register (CSR), at least a portion of a register file, or one or more hidden registers.

In some embodiments, a computing environment includes a multi-threaded processor. In some embodiments the multi-threaded processor is a fine-grain multi-threaded processor. In some embodiments the multi-threaded processor is a multi-core processor. In some embodiments the multi-threaded processor is a super scaler pipelined processor with dual-issue multi-stage pipelined, in-order completions. In some embodiments, the multi-threaded processor is configured to execute multiple different programs concurrently by time multiplexing a single core.

In some embodiments in which the multi-threaded processor is a fine-grain multi-threaded processor, each pipeline stage is occupied by a different thread or different program. However, the processor may only support a certain maximum number of threads due to hardware limits. These hardware limits restrict the number of threads.

In some embodiments, these hardware limits include requiring that each thread have certain specific hardware support. For example, in some embodiments, a thread is required to have at least one of a program counter, a register file, or a CSR. The specific hardware required to support a thread may vary depending on specific implementations. For example, in some particular embodiments, if there are four sets of CSR's and four register files, then the maximum number of threads supported by this particular hardware is four threads—that is, each thread has at least its own register file and CSR.

In some embodiments, there are a plurality of threads and there is a thread switch for each pipeline stage. This would occur, for example, in embodiments in which the multi-threaded processor is a fine-grain multi-threaded processor.

In some embodiments, individual threads of a plurality of threads are configured to communicate state from one individual thread to another individual thread via register files. For example, a first thread may include a first register file with one or more read outputs that are communicably linked via one or more communication links with one or more write inputs of a second register file of a second thread. In some more specific embodiments, the one or more communication links may include combinational logic for routing state information, such as for example, one or more decoders, one or more multiplexors, and/or the like.

In a specific particular embodiment, the plurality of threads includes four threads that each include their own register file. A first thread may be configured to transmit its state to a second thread, the second thread may be configured to transmit its state to a third thread, the third thread may be configured to transmit its state to a fourth thread, and the fourth thread may be configured to transmit its state to the first thread. In the above examples, the threads communicate the state via their respective register files, and optionally, via one or more additional communication links. Other embodiments may have different numbers of threads and different linkages between threads.

In some embodiments, a register includes one or more status bits indicates an availability status of a thread. An availability status may, for example, be at least one of active or idle. That is, an availability status may indicate if a thread is an active thread or an idle thread. In some embodiments, an availability status register (ASR) includes one or more status bits that indicate an availability status of a thread. In some particular embodiments an ASR is per thread—that is, a given thread has an ASR specific and exclusive to the given thread. In some other particular embodiments, an ASR is global and contains availability status for all threads of a plurality.

In some embodiments, the one or more status bits are set with software, such as for example by an operating system or a task scheduler. In some embodiments, the one or more status bits are set by a hardware thread using hardware. In general, setting the one or more status bits with hardware is faster but sacrifices flexibility and usability. In some specific embodiments, either hardware or software may be capable of setting the one or more status bits.

In some embodiments, an ASR contains additional bits with additional information regarding a thread. For example, an ASR may include bits indicative of one or more registers whose contents must be copied as part of a context switch. In some particular embodiments, an ASR has one or more bits that indicate one or more registers of a register file that must be copied as part of a context switch.

For example, in one possible scenario, an ASR may include X bits, such as for example, six bits. A least significant bit, such as for example, ASR[0] indicates 1 for an availability status of active or indicates 0 for an availability status of idle. The other more significant bits, bits 1-5, denoted ASR[5:1] are configured to indicate registers in a register file that must be copied as part of a context switch. For example, if an exemplary register file has 32 registers from R0 to R31, then a possible configuration of an exemplary ASR is as follows:

a. ASR[5:0] denotes that the ASR is a 6 bit register, where ASR[0] is the least significant bit and ASR[5] is the most significant bit.
b. If bit ASR[5] is 1 then it denotes registers R0 to R23 which is 24 registers.
c. If bit ASR[4] is 1 then it denotes registers R0 to R15 which is 16 registers.
d. If bit ASR[3] is 1 then it denotes registers R0 to R7 which is 8 registers
e. If bit ASR[2] is 1 then it denotes registers R0 to R3 which is 4 registers
f. If bit ASR[1] is 1 then it denotes registers R0 to R31 which is 32 registers.
g. If bit ASR[0] is 1 then it denotes thread is active and if the bit ASR[0] is zero, then it denotes that the thread is idle.
h. From bit 5 to bit 1 is exclusive which means that only one bit can be set to 1.

In some embodiments, in the above scenario, the R0 is 0, R1 stores the value of the program counter plus four, and R2 stores a stack pointer.

Some embodiments address three cases:

a. Case one: An active thread either receives an interrupt or needs to call a subroutine, but there is no idle thread.
b. Case two: An active thread (e.g., a main thread) receives an interrupt and an idle thread is available (e.g. ASR[0] is 0).
c. Case three: An active thread (e.g., a main thread) needs to call a subroutine and an idle thread is available.

Case One: In the event of Case one, there is no idle thread available to serve as a resource to expedite the handling of the interrupt or the subroutine. Thus, in some embodiments, the interrupt or the calling of the subroutine is handled in the usual way. That is, the steps discussed below regarding cases two and three are not taken.

Case Two: In the event of Case two, in some embodiments the processor cancels the current unfinished pipeline operations for the main thread (the active thread). The main thread sets the ASR bits to indicate to the employed thread that all registers of the register file need to be copied. The state of the main thread is copied into a register file associated with the employed thread (formerly the idle thread). In some embodiments, the content of a first register file associated with the main thread is copied to a second register file associated with the employed thread. In some further embodiments, at least one of a program counter or a CSR associated with the main thread are also copied to the second register file. In some further embodiments, one or more hidden registers are also copied to the second register file.

In some specific embodiments, the program counter is first pushed directly to a stack and is not copied via a register file. Other registers are then copied to the employed thread. In some further specific embodiments, the CSR is not copied for access by the employed thread. In these further specific embodiments, an interrupt routine executed by the main thread may copy one or more CSR's (there may be more than one) for access by the employed thread, if access to the one or more CSR's is needed by the employed thread.

In addition, in some embodiments, ASR[0] associated with the employed thread is changed from '0' for idle to '1' for employed (e.g., active). In some embodiments the bits of the ASR are 000011, wherein ASR[1]=1 indicates that all registers of the first register file are to be copied to the second register file and then to the stack and wherein ASR[0]=1 indicates that the second thread is active.

In some further embodiments the main thread (after the copying of its state to the employed thread) returns to execute an interrupt service routine (e.g., interrupt handler) to service the interrupt. Meanwhile, the employed thread begins storing the state of the first thread (now stored in its register file) to a stack in memory. In some particular embodiments, the employed thread utilizes micro code generated by a state machine. The state machine introduces the micro code into one or more decoding stages of the pipeline. Once the employed thread has finished storing the state of the first thread to the stack in memory, it sets ASR[0] from '1' for active to '0' for idle and goes inactive (e.g., free for another task).

Cases Three: In the event of case three, in some embodiments the processor cancels the current unfinished pipeline operations for the main thread (the active thread). The main thread sets the ASR of the idle thread (now an employed thread). In setting the ASR, the main thread sets the number of registers to be copied, per discussion above. For example, as discussed above, if the main thread sets the ASR bits to 000011, then the employed thread is active and is not available for other tasks and all 32 registers of an exemplary register are to be copied to the register file of the employed thread and then to the stack. As a further example, if the main thread sets the ASR bits to 000101, then the employed thread is active and is not available for other tasks (as before), but only 4 registers (R0-R3) are to be copied to the register file of the employed thread and then to the stack.

The state of the main thread is copied into a register file associated with the employed thread. In some embodiments, the content of a first register file associated with the main thread is copied to a second register file associated with the employed thread. In some further embodiments, at least one of a program counter or a CSR associated with the main thread are also copied to the second register file. In some further embodiments, one or more hidden registers are also copied to the second register file.

In some specific embodiments, the program counter is first pushed directly to a stack and is not copied via a register file. Other registers are then copied to the employed thread. In some further specific embodiments, the CSR is not copied for access by the employed thread.

In some further embodiments the main thread (after the copying of its state to the employed thread) returns to call and execute the subroutine. Meanwhile, the employed thread begins storing the state of the first thread (now stored in its register file) to a stack. In some particular embodiments, the employed thread utilizes micro code as discussed above relative to case two. Reference is therefore made to that above discussion.

Dependency checks: The need for a dependency check arises where the employed thread is still performing store operations to store the state of the first thread to the stack. And the stack is associated with a range of memory addresses. And meanwhile, the main thread seeks to perform a load operation from the above memory address range where the employed thread is performing the store operations. If the main thread completes a load operation from a memory location in this memory address range—where a store operation may not yet be complete—then the main thread may be accessing stale or incorrect data. As part of preventing the main thread from accessing stale or incorrect data, a dependency check may be performed.

However, in some embodiments, in the event of case two, a dependency check is not performed. Thus, these embodiments do not perform a dependency check between the data it is storing in the stack and any load operations that may be made by the main thread in executing the interrupt service routine. This is because there is a low probability that a load operation by the main thread in executing an interrupt service routine is going to implicate a memory location in the above memory address range. Because of this low probability, these embodiments do not conduct a dependency check.

In the event of case three, some embodiments do perform a dependency check. This dependency check may include defining a memory address range in which the employed thread is conducting store operations. Then, if the first thread has a load operation that would load from this memory address range, then the load operation is stalled.

In some embodiments, the dependency check is performed with a store buffer that has associated logic. This store buffer is shared by all active threads. The store buffer keeps data associated with loads and stores. When load data appears in the store buffer there is a delay before the load is performed. During this delay, store buffer logic performs a dependency check. Thus, store buffer logic is constantly monitoring load activity to determine if any load overlaps an address range associated with store activity in the stack.

In some embodiments, the store buffer logic utilizes a stack pointer (or a base pointer or other register containing an address to at least a portion of the stack) and the ASR register to determine the memory address range for the store activity. For example, a stack pointer may indicate the top of the stack and the ASR register may be used to determine the size of the stack. The size of the stack may be indicated by bits ASR[5:1] (e.g., bits 1 thru 5). If, for example, ASR[3] is 1, then it may denote register files R0 to R7 which are 8 registers. If the registers are 32-bit registers, then this information plus a stack pointer may be used to compute the memory address range for the store operations. In some particular embodiments, the store buffer updates the above memory address range as actual store operations are made.

In the drawings and the descriptions that follow, various structures, devices, and/or components are shown (e.g., processors, cores, buses, memories, registers, etc.). Unless explicitly stated, the number of such structures, device, and/or components shown is not intended to be limiting. Instead, the drawings and descriptions are simplified to avoid obscuring the salient principles with unnecessary clutter or unneeded repetition. For example, the mere fact that a single structure, device, and/or component is shown is not intended to limit embodiments to only one such structure, device, and/or component (unless explicitly so stated). In addition, some structures that would be present in actual devices are omitted to avoid clutter and to avoid detracting from a clear presentation.

Referencing FIG. 1, a computing device 100 in which some embodiments may be practiced includes a processor 102. In the embodiment illustrated, processor 102 is a multi-threaded, multi-core processor. Although only one processor is shown, this is not intended to be limited, but merely exemplary. Processor 102, in accordance with the embodiment shown, includes exemplary cores 104A-104C. Again, the number of cores is not intended to be limiting as an actual embodiment may have fewer (e.g., only one) cores or a greater number of cores. In some embodiments processor 102 is a fine-grain multi-threaded, multi-core processor. In some embodiments processor 102 is a super-scaler processor.

In various embodiments, different types of processors are possible. For example and without limitation, in some embodiments at least one of a microcontroller, a microprocessor, an embedded processor, a digital signal processor (DSP), or a media processor are used. In some embodiments, a graphics processing unit (GPU) is used. Various types of architectures are also possible, including for example, without limitation, one or more of a reduced instruction set computer (RISC), complex instruction set computer (CISC), minimal instruction set computer (MISC), and/or other instruction set architectures. Any of the above can be adopted in various embodiments without departing from the scope of this disclosure.

The use of CISC versus RISC may have consequences. Most RISC instructions can be executed in a single clock cycle in a given pipeline stage. In contrast, CISC instructions may require more clock cycles in a pipeline stage. For this reason, single CISC instructions may be replaced by multiple RISC instructions. In some embodiments, this replacement may, in some embodiments, be performed with microcode.

Computing device 106 further includes a memory 106. In some embodiments, memory 106 is a volatile memory (e.g., a working memory), such as for example, a random access memory, or other type of volatile memory. For example, in some specific embodiments, memory 106 is a static random access memory (SRAM). And in some embodiments, memory 106 is a non-volatile memory, such as for example a flash memory, a hard drive, or other non-volatile memory. Memory 106 is a computer-readable medium bearing executable instructions (e.g., these executable instructions may be regarded as being a portion of control circuitry 108) that can cause processor 102 to execute one or more methods, such as for example, those illustrated via FIGS. 7, 9, and 10.

Computing device 100 further includes a communication bus 118. In some embodiments communication bus 118 includes one or more of an address bus, a data bus, or a control bus. In some embodiments communication bus 118 is or includes various communication link technologies. These communication link technologies may include (as non-limiting examples) communication links based on one or more of ISA (Industry Standard Architecture), EISA (Extended Industry Standard Architecture), MCA (Micro Channel Architecture), VESA (Video Electronics Standards Association), PCI (Peripheral Component Interconnect), or PCI-X (PCI Express). The communication bus is communicably coupled with both multi-threaded, multi-core processor 102 and memory 106.

The above bus technologies are typically utilized on a circuit board of a computing device. Bus technologies utilized on a chip include advanced extensible interface (AXI), advanced high-performance bus (AHB), as well as custom non-standard on-the-chip buses.

In some embodiments, memory 106 includes one or more of control circuitry 108 (e.g., instructions, associated logic), data 110, or an operating system 112. In some embodiments, data 110 includes one or more memory locations for a stack 120 for storing state. In some embodiments, an exemplary core 104A includes one or more threads, such as for example threads 114 (T1) and 116 (T2). Although control circuitry 108 is shown as being part of memory 106, in some embodiments control circuitry 108 contains logic resident in the processor 102, a state machine (e.g. microcode), or other locations.

Figure 2:
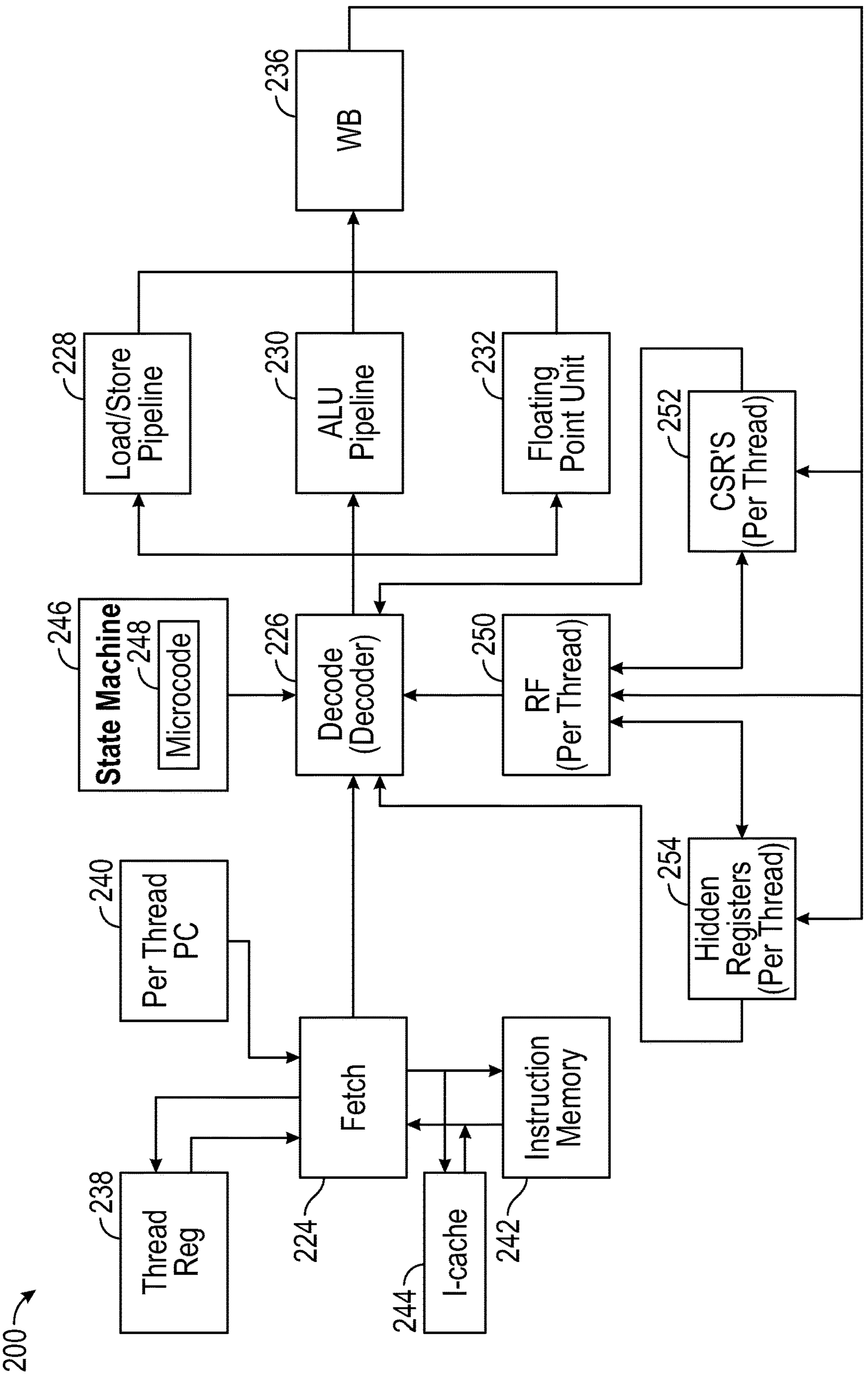
FIG. 2 is a simplified block diagram of an exemplary processor for use with some embodiments. Shown are pipeline stages and some components providing inputs into the pipeline stages.
Figure 3:
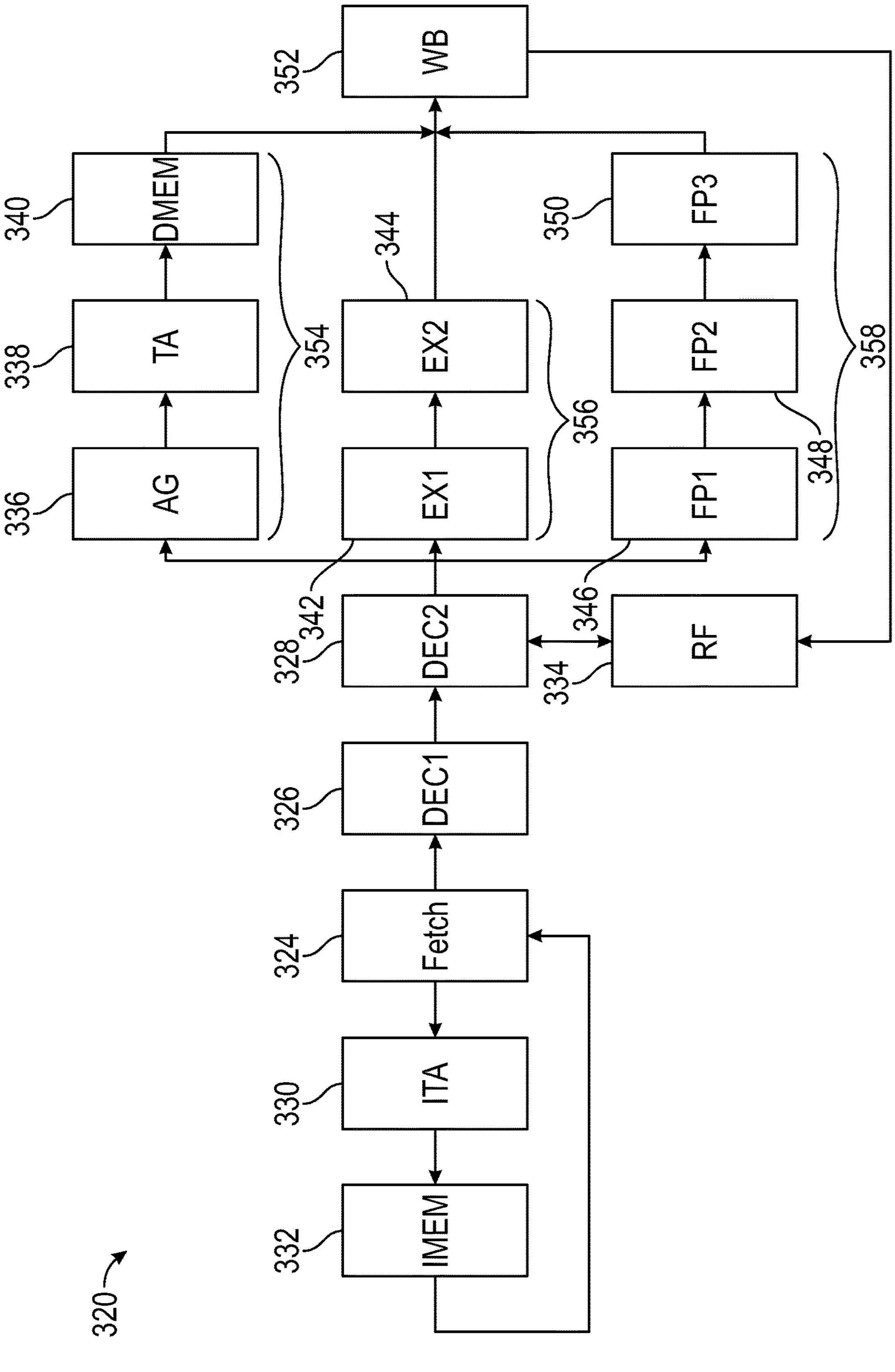
FIG. 3 is a simplified block diagram of an exemplary pipeline for use with some embodiments. Shown are pipeline stages and a register file that provides inputs to and receives outputs from the pipeline stages.

Referencing FIG. 2, an exemplary multi-threaded superscaler processor 200 is shown with sequential pipeline stages. The pipeline stages include a fetch stage 224, a decode stage 226 (e.g., implemented at least in part with one or more decoders), and three sequences 228, 230, and 232, followed by a write-back (WB) stage 236. The three sequences are alternatives to each other include a load/store pipeline 228, an arithmetic logic unit (ALU) pipeline 230, and a floating point unit 232. The load/store pipeline 228 and the ALU pipeline 230 are composed of further stages, which are not shown in FIG. 2. However, possible implementations of the load/store pipeline 228 and the ALU pipeline 230 are shown on FIG. 3. The floating point unit 232 has its own route because its logic requires more than a single clock cycle (a floating point unit is also shown in FIG. 3 as being composed of FP1, PP2, and FP3, as discussed below regarding FIG. 3). The illustrated pipeline stages are simplified and exemplary only. For example, some embodiments would include a pre-fetch stage that is now shown for simplicity.

The fetch stage 224 causes an instruction to be fetched from an instruction cache 244, and if not available from the instruction cache 244, from instruction memory 242. The fetched instructions are associated with a thread whose thread identifier is available via communication links with a thread registry 238. The thread registry 238 includes the thread identifiers and, in some embodiments, one or more thread execution sequences. In some embodiments, fine-grained multi-threading is performed in which an instruction is first fetched for a first thread in a first clock cycle, another instruction is then fetched for a second thread on a second clock cycle, and another instruction is perhaps fetched for a third thread on a third clock cycle, and so on. Different fetching and multi-threading regimes are possible. The instructions for the various threads are stored in per thread program counters 240 that store the address of the next instruction for each thread.

After the fetch stage 224 fetches an instruction, it is decoded in the decode stage 226. Decoding includes obtaining any operands, which are available via read requests to an applicable register file of a plurality of per thread register files 250. In some embodiments, at least some of these per thread register files 250 are communicably linked to read and write to each other (e.g., at least partly via one or more linked read ports and write ports-see e.g., 456, 458 of FIG. 4). In some embodiments, the per thread register files 250 include or are linked to one or more of per thread hidden registers 254 or per thread CSR's 252. In these embodiments, the per thread one or more hidden registers 254 and the per thread CSR's 252 are communicably linked to provide their respective outputs to the decode stage 226

In some particular embodiments, the decode stage optionally receives microcode 248 for optimization of store operations from finite state machine 246. The microcode insertion may provide for improved performance. For example, microcode may be used to modify instructions, for example converting one instruction into multiple instructions or combining two or more instructions into a single instruction. In some implementations, finite state machine is hard-wired logic. On alternative implementations, the finite state machine 246 is implemented with executable instructions. In yet other alternative implementations, the microcode is not generated by the finite state machine, but is stored in a read-only memory and provided to decode stage via the finite state machine 246.

After the decoding stage 226, the instruction and any operands move to one of the load/store pipeline 228, the ALU pipeline 230, or the floating point unit 232. Control then moves to the write-back stage 236 for the storing of any computed result. In some embodiments, write-back stage 236 is communicably linked to transmit any result back to at least one of the appropriate register file of the per thread register files 250, the one or more per thread hidden registers 254 or the per thread CSR's 252. Thus, any result is provided to the correct register file for the correct thread that produced the result.

Referencing FIG. 3, an exemplary pipeline 320 for a super-scaler processor is shown. This pipeline 320 would be consistent with a dual in-order issue, in-order completion microprocessor. Pipeline 320 includes a load/store sequence 354, an ALU sequence 356, and a floating point sequence 258, all to execute instructions.

In some embodiments, pipeline 320 attempts to fetch two 32-bit instructions each clock cycle and, if the fetches are successful, store the two instructions in an instruction buffer in the fetch stage 324. On the following cycle, control flows to one of two decode stages 326 (DEC1) and 328 (DEC2). DEC1 (326) decodes instructions from the instruction fetch buffer and decides which of load/store sequence 354, ALU sequence 356, or floating point sequence 258 is to be used to execute the fetched instructions. DEC2 (328) attempts to obtain the necessary operands for the instructions decoded by DEC1, such as from a read from register file 334 (which in some embodiments is a set of per thread register files). If the pipeline sequence (354, 356, or 358) is not available or if an operand is not available from the register file or pipeline, then the decoded instruction stalls until the sequence or operand is available.

The load/store sequence 354 includes an address calculation stage 336 (AG) which calculates a virtual address and an address translation stage (338) which converts the virtual address to a physical address. The physical address can address a target address in a data cache or in non-cacheable memory. The load/store sequence 354 further includes a memory access state 340 (DMEM). For load operations (e.g., memory read operations), the DMEM obtains the required data from memory and the data is then saved to a register file in the write-back stage 352 (WB). For store operations (e.g., memory write operations) for storing data into an SRAM, the data is stored in the DMEM stage. For store operations for storing data into a cacheable area (e.g., a data cache), the data is stored into a data cache in the WB stage 352.

The ALU sequence 356 include a first execution stage 342 (EX1) and a second execution stage 344 (EX2) for performing arithmetic operations on integers. These integer arithmetic operations include operations such as such as multiplication, addition, subtraction, logical, and shift operations. All of the above operations are performed in a pipeline manner where EX1 performs part of the operation and EX2 performs another part of the operation.

The floating point sequence 358 performs floating point arithmetic and includes a first floating point stage 346 (FP1), a second floating point stage 348 (FP2), and a third floating point stage 350 (FP3). Due to complexity, floating point operations are pipelined in 3 clock cycles, one clock cycle each for FP1, FP2, and FP3.

The writeback stage 352, obtains one or more outputs from one or more of the load/store sequences 354, the ALU sequence 356, or the floating point sequence 258 and writes these one or more outputs to register file 334. In some embodiments, register file 334 is a plurality of per thread register files.

Returning to fetch stage 324, it can provide a virtual instruction address of an instruction-to-be-executed to ITA 330 to convert the virtual instruction address to a physical instruction address. ITA 330 provides the physical instruction address to IMEM 332, which in some implementations is an instruction cache or statis random access memory (SRAM). IMEM 332 uses the physical instruction address to obtain the next instruction and provides the next instruction to fetch stage 324.

Figure 4:
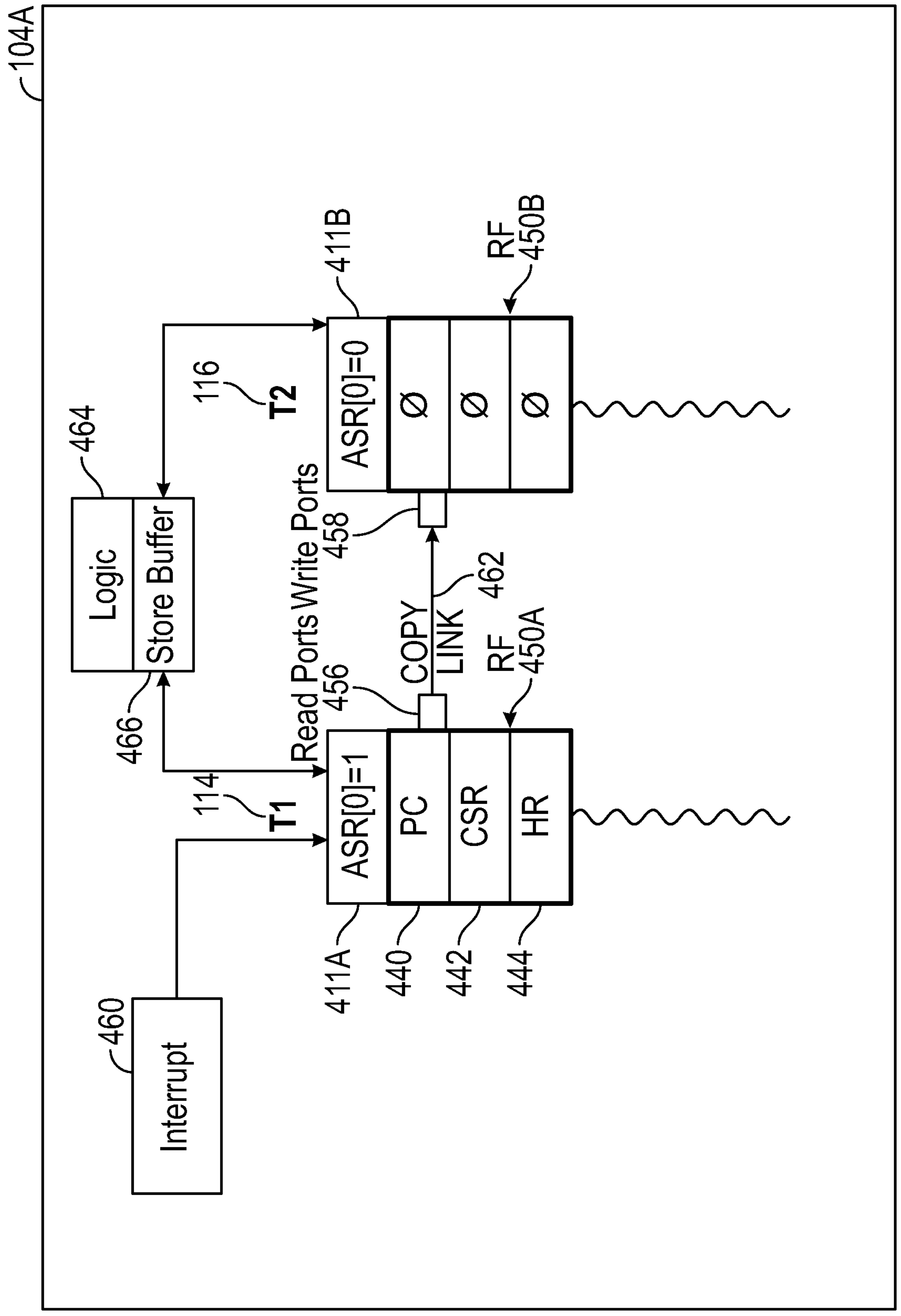
FIG. 4 is a simplified block diagram of a core (introduced in FIG. 1) with which some embodiments may be practiced, showing threads and some of their components.

Referencing FIG. 4, the core 104A of FIG. 1 includes a first thread 114 (T1) and a second thread 116 (T2). These two threads are shown for simplicity. A core could have additional threads. For example, in some embodiments, core 104A includes 4 threads. In some embodiments, threads 114 and 116 are hardware threads because both are associated with respective dedicated hardware (e.g., a register file), as discussed below.

Both thread 114 and thread 116 include an availability status register (ASR). That is, thread 114 includes ASR 411A and thread 116 includes ASR 411B. In some embodiments, ASR 411A and 411B are hardware specifically dedicated to threads 114 and 116. Consistent with some embodiments, the least significant bit of ASR 411A, ASR[0] is equal to 1. This value of 1 for ASR[0] indicates that thread 114 is an active thread. Also consistent with some embodiments, the least significant bit of ASR 411B, ASR[0] is equal to 0. The value of 0 for ASR[0] indicates that thread 116 is an idle or otherwise inactive. For example, thread 116 could be in a deactivated status.

Both thread 114 and thread 116 further include respective register files. That is, thread 114 includes register file 450A and thread 116 includes register file 450B. Consistent with its active status, the register file 450A of thread 114 includes at least a program counter 440, an CSR 442, and hidden registers (HR) 444. Register file 450A is simplified. In an actual implementation, 450A could include additional registers, for example 32 registers, or some other number of registers. As shown, register file 450A further includes read ports 456 for reading values from the registers of register file 450A. In an actual implementation, register file 450A would further include write ports, which for purposes of simplicity, are not shown.

In some embodiments register file 450A and registers 440, 442, and 444 are dedicated exclusively to thread 114. In particular, register file 450A is implemented in hardware and is dedicated to thread 114, which is a hardware thread. In some embodiments, at least a register file is required hardware for a thread. In some further embodiments, a thread requires one or more of a program counter 440, a CSR 442, or at least some of the hidden registers 444.

In contrast to register file 450A, register file 450B of thread 116 is either empty (indicated by null signs in FIG. 4) or has inactive values that may be overwritten. Register file 450B is shown with write ports 458 for writing values to the registers of register file 450B. In some embodiments, write ports 458 of register file 450B are communicably linked with read ports 456 of register file 450A via communication copy link 462. In some embodiments, copy link includes additional hardware such as for example, one or more multiplexors (not shown).

In some embodiments, thread 114 may receive an interrupt 460. They system (e.g., processor 102) checks ASR 411B of thread 116 and determines that ASR[0] is '0', indicating that thread 116 has an idle availability status. The contents of register file 450A (including the contents of program counter 440, CSR 442, and hidden registers 444 copied to register file 450B. That is, the contents of the above registers are read via read ports 456, communicated over copy link 462, and received at write ports 458 of register file 450B for writing into the registers of register file 450B.

In some embodiments, core 104A includes a store buffer 466 with associated logic 464. As discussed above, store buffer 466 and its associated logic 464 may be utilized for dependency checks. In some embodiments, the associated logic 464 is physically coupled with the store buffer 466. In other embodiments, the associated logic 464 is remote from the store buffer 466 and may be associated with a thread, such as for example, an employed thread.

Figure 5A:
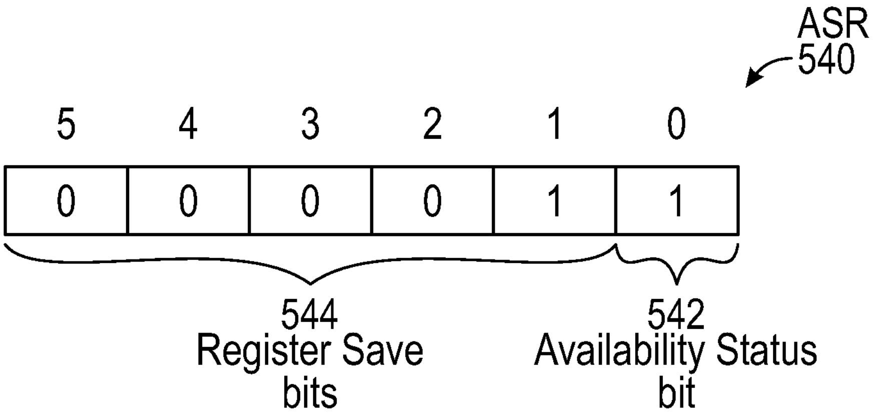
FIG. 5A is a simplified block diagram of an availability status register (ASR), which has an availability status bit and a plurality of register save bits, consistent with some embodiments.

Referencing FIG. 5A, consistent with some embodiments, an ASR 540 includes six bits and may be referenced as ASR[5:0], which merely indicates that the ASR is a six bit register with bits 0 thru 5. ASR 540 includes an availability status bit 542, which can be 1 to indicate an active status or 0 to indicate an inactive status. In some embodiments the ASR status bit is the least significant bit and may be referenced as ASR[0].

ASR 540 further includes a plurality of register save bits 544 which indicate the number of registers of a register file of an active thread to copy to the register file of an idle thread. In the embodiment shown, there are five register save bits, that is, bits 1-5. These may be collectively referenced as ASR[5:1]. The meaning of the various register save bits (for a register file with 32 bits) is discussed in an above discussion of ASR's. In the ASR shown, ASR[1]=1 and ASR[0]=1. This configuration indicates that all 32 registers of an active thread are to be copied and that the availability status of a thread is employed (e.g., no longer available for other tasks) in saving the state of another thread.

Figure 5B:
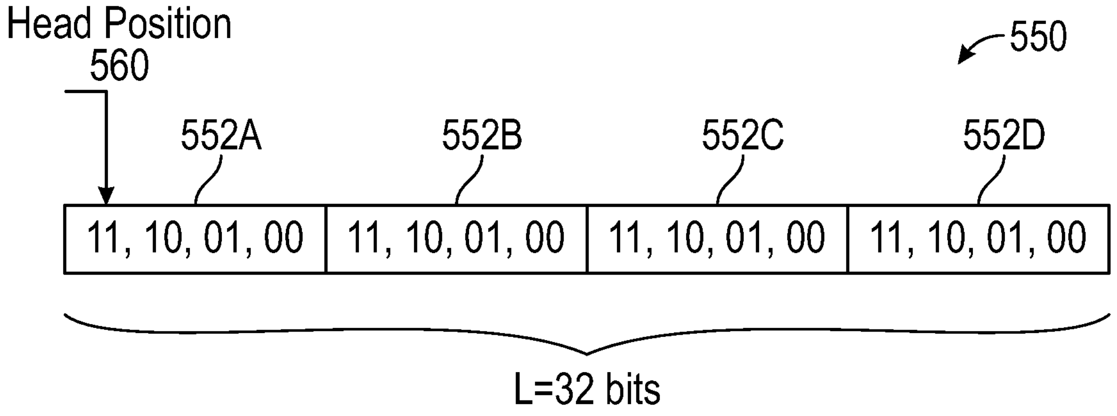
FIG. 5B is a simplified block diagram of a circular register for indicating active thread ID's, consistent with some embodiments.

Referencing FIG. 5B, an example of a thread register (e.g., thread register 238) is shown as circular register 550, which has a length of 32 bits. In some embodiments, circular register 550 is a global register. For example, there is only one circular register 550 stored in processor 102 and shared among the threads. In the embodiment shown, each thread identifier is two bits: 00, 01, 10, and 11. This circular register 550 is shifted by two bits each clock cycle to which thread is to be used in the decode stage in the next clock cycle.

In some specific embodiments, a head position 560 of circular register 550 indicates which thread will occupy decode state 226. In these embodiments, fetch stage 224 fetches instructions and saves these instructions into instruction buffers (not shown) before decode stage 226. Decode stage 226 then accesses the head position 560 of circular register 550 to identify the current thread and to select the correct saved instruction from the buffers. Decode stage 226 then places this correct instruction into one of the instruction pipelines 228, 230, or 232. The location of head position 560 of FIGS. 5B and 5C is not intended to be limiting, as this location can vary in different implementations.

Circular register 550 is shown with thread identifiers for four thread sequences 552A-552D. Four active threads are identified by thread identifiers 11, 10, 01, 00. Thus, assuming there are four threads, all four are active and they are dividing the available processing power at 25% each.

Figure 5C:
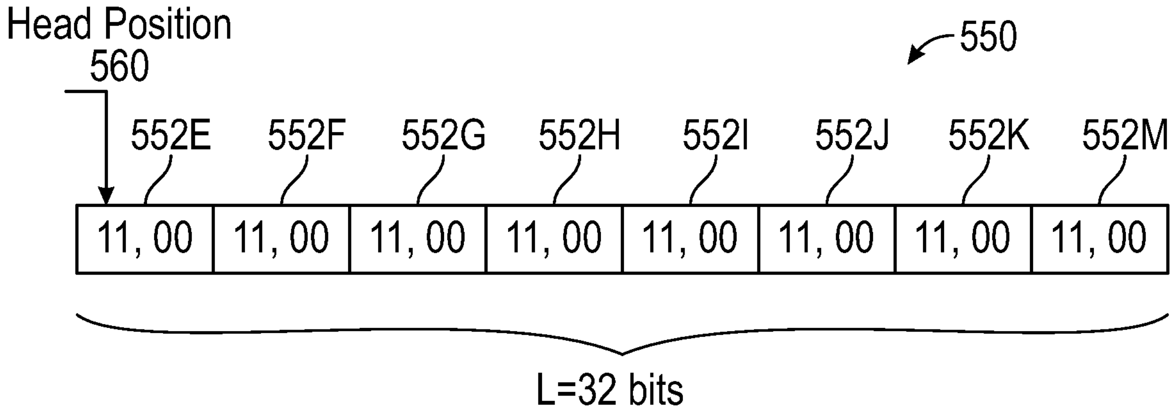
FIG. 5C is a further simplified block diagram of the circular register of FIG. 5B for indicating different active thread ID's, consistent with some embodiments.

Referencing FIG. 5C, the circular register 550 of FIG. 5B is shown with a different set of active threads. Circular register is shown for 8 sequences 552E-552M. Two active threads are identified by thread identifiers 11, 00. Thus, assuming there are four threads, only two are active and they are dividing the available processing power at 50% each.

In one scenario a thread has ASR[0] set as zero and is therefore an idle thread. The circular register 550 shows multiple active threads and at least one idle thread. At that time a priority task occurs (e.g., an interrupt, a subroutine call, etc.). Then, the idle thread becomes an employed thread and is added as active thread in the circular register 550.

As a specific example of the above scenario, assume that the circular register 550 shows the following three active thread identifiers in four sequences: [00, 10, 00, 11; 00, 10, 00, 11; 00, 10, 00, 11; 00, 10, 00, 11]. Thus, thread 00 has two slots in each of the four sequences. And thread 01 is not active (e.g., is idle) and no longer appears in circular register 550.

Then, thread 00 receives a priority task. Idle thread 01 is activated and its ASR[0] is set to 1. Then the circular register 550 is updated as follows: [00, 10, 01, 11; 00, 10, 01, 11; 00, 10, 01, 11; 00, 10, 01, 11]. Employed thread 01 takes a slot formerly occupied by thread 00. In this example, threads 10 and 11 do not have any performance impact due to this change. The performance impact is on the main thread 00, which shares its processor time with employed thread 01. Once employed thread 01 completes its store of thread 00's state, then thread 01 is deactivated, its ASR[0] bit is reset to 0, and the circular register 550 returns to its previous four sequences: [00, 10, 00, 11; 00, 10, 00, 11; 00, 10, 00, 11; 00, 10, 00, 11].

In the above specific example, it is possible that threads 10 and 11 are not available to thread 00 because the register file of thread 00 is communicably linked to the register file of thread 01, but not to the register files of thread 10 and 11.

Figure 6:
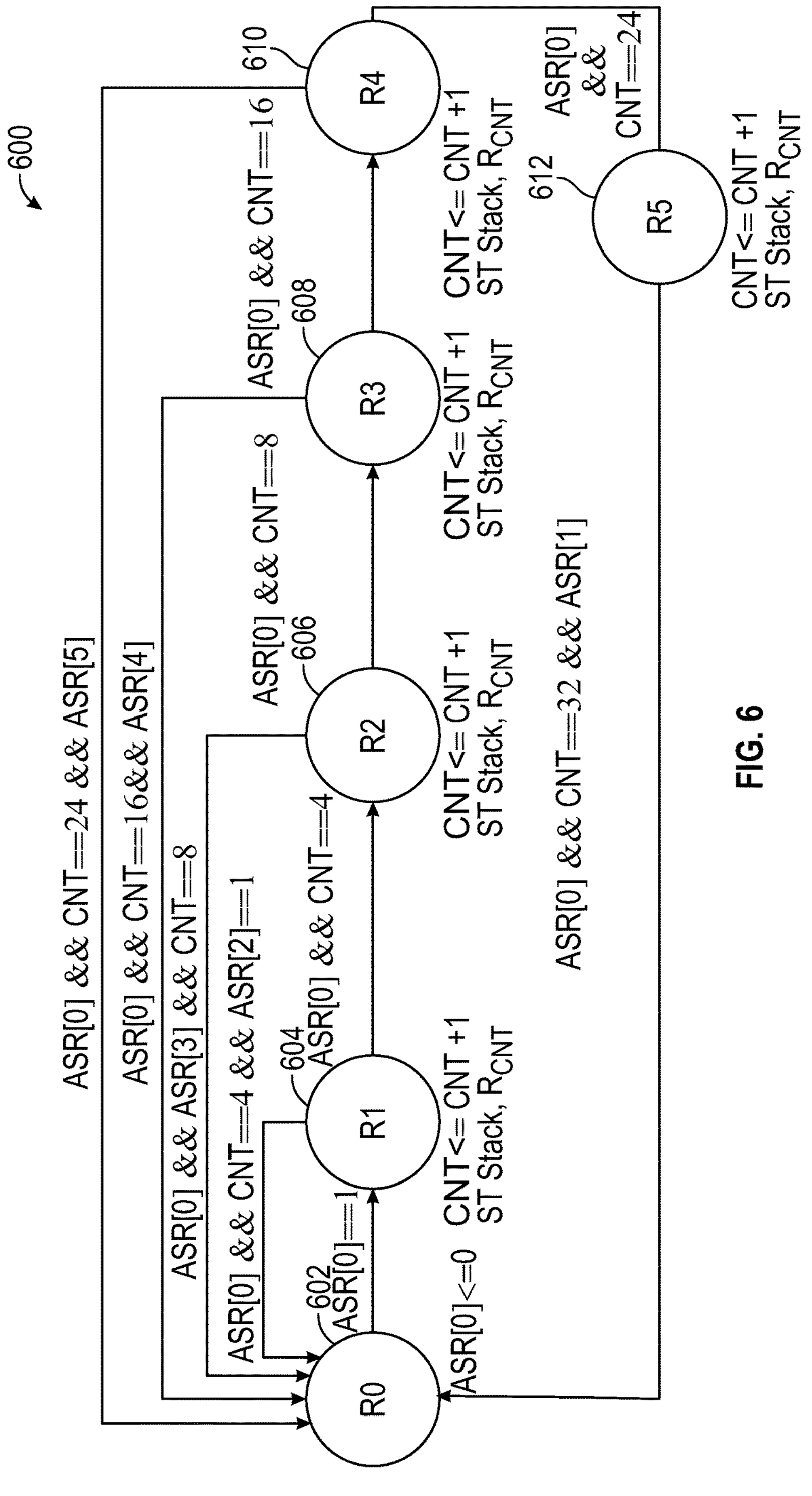
FIG. 6 is a simplified block diagram showing a state machine and its various states, consistent with some embodiments.

Referencing FIG. 6, consistent with some embodiments, an optional state machine 600 is shown. State machine 600 is communicably coupled with a decode stage, (see e.g., state machine 246 of FIG. 2 configured for outputting microcode 248 to decode stage 226) to optimize the storing of thread state to a sack. State machine 600, as shown, has six states R0 (602), R1 (604), R2 (606), R3 (608), R4 (610), and R5 (612). CNT is a counter variable that counts the number of registers whose content has been saved to the stack.

The exemplary embodiment of FIG. 6 is based on their being a total of 32 registers to be saved. Further, this exemplary embodiment is performed with a 6-bit ASR (ASR[5:0]) (see, e.g., ASR 540). The least significant bit of the 6-bit ASR is ASR[0] which can be equal to 1 to indicate an employed thread and 0 to indicate an idle thread. The remaining 5 bits are register save bits that indicate the number of registers to be saved. Thus, the register save bits are ASR[1] thru ASR[5], where only one of these bits can be set to 1 at a time. Further, in this embodiment, ASR[2] being set to 1 indicates 4 registers, ASR[3] being set to 1 indicates 8 registers, ASR[4] being set to 1 indicates 16 registers, ASR[5] being set to 1 indicates 24 registers, and ASR[1] being set to 1 indicates 32 registers.

The states and their transitions are as follows:

a. R0: This is the start stage. To begin ASR[0] is set to 1, indicating a transition from an idle thread an employed thread. Control moves to state R1.

b. R1: At stage R1, 4 registers are copied to the stack and the variable CNT is incremented to 4. Then, if ASR[2] is set to 1, ASR[0] is set to 0 to designate the thread as idle, control returns to R0, and the state machine 600 terminates. If ASR[2] is not set to 1, but one of ASR[3], ASR[4], ASR[5], or ASR[1] is set to 1, then control moves to stage R2.

c. R2: At stage R2, 4 additional registers are copied to the stack and the variable CNT is incremented to 8. Then, if ASR[3] is set to 1, ASR[0] is set to 0 to designate the thread as idle, control returns to R0, and the state machine 600 terminates. If ASR[3] is not set to 1, but either ASR[4], ASR[5], or ASR[1] is set to 1, then control moves to stage R3.

d. R3: At stage R3, 8 additional registers are copied to the stack and the variable CNT is incremented to 16. Then, if ASR[4] is set to 1, ASR[0] is set to 0, control returns to R0, and the state machine 600 terminates. If ASR[4]

is not set to 1 and either of ASR[5 [ or ASR[1] is set to 1, then control moves to stage R4.

e. R4: At state R4, 8 additional registers are copied to the stack and the variable CNT is incremented to 24. Then, if ASR[5] is set to 1, ASR[0] is set to 0, control returns to R0, and the state machine 600 terminates. If ASR[5] is not set to 1 and ASR[1] is set to 1, then control moves to stage R5.

f. R5: At stage R5, 8 additional registers are copied to the stack and the variable CNT is incremented to 32. Then ASR[0] is set to 0 to designate the thread as idle and control returns to R0 and the state machine 600 terminates.

At each of stages R1 thru R5, the following logic is executed: CNT<=CNT+1, ST stack, $R_{CNT}$. The foregoing is pseudo code based on hardware descriptive language (HDL). In HDL, CNT<=CNT+1 means CNT value will be increased by 1 on the clock edge. And the variable Ront refers to the state machine stage associated with CNT. For example, utilizing the stages described above, if CNT is 10, Rcnet will be 3 (for stage 3) because CNT is between 9 and 16. STstack refers to the stack address. Thus, in the operation STstack, Rent, the registers of the register file corresponding to Rent are stored to the stack. Thus, this pseudo code moves state machine 600 through the different stages R1 thru R5.

In some embodiments, state machine 600 is hardwired logic that generates microcode that is injected into the decoding stage (e.g., decoding stage 226). In alternative embodiments, state machine 600 is implemented in software. In yet other embodiments, there is no state machine.

Figure 7:
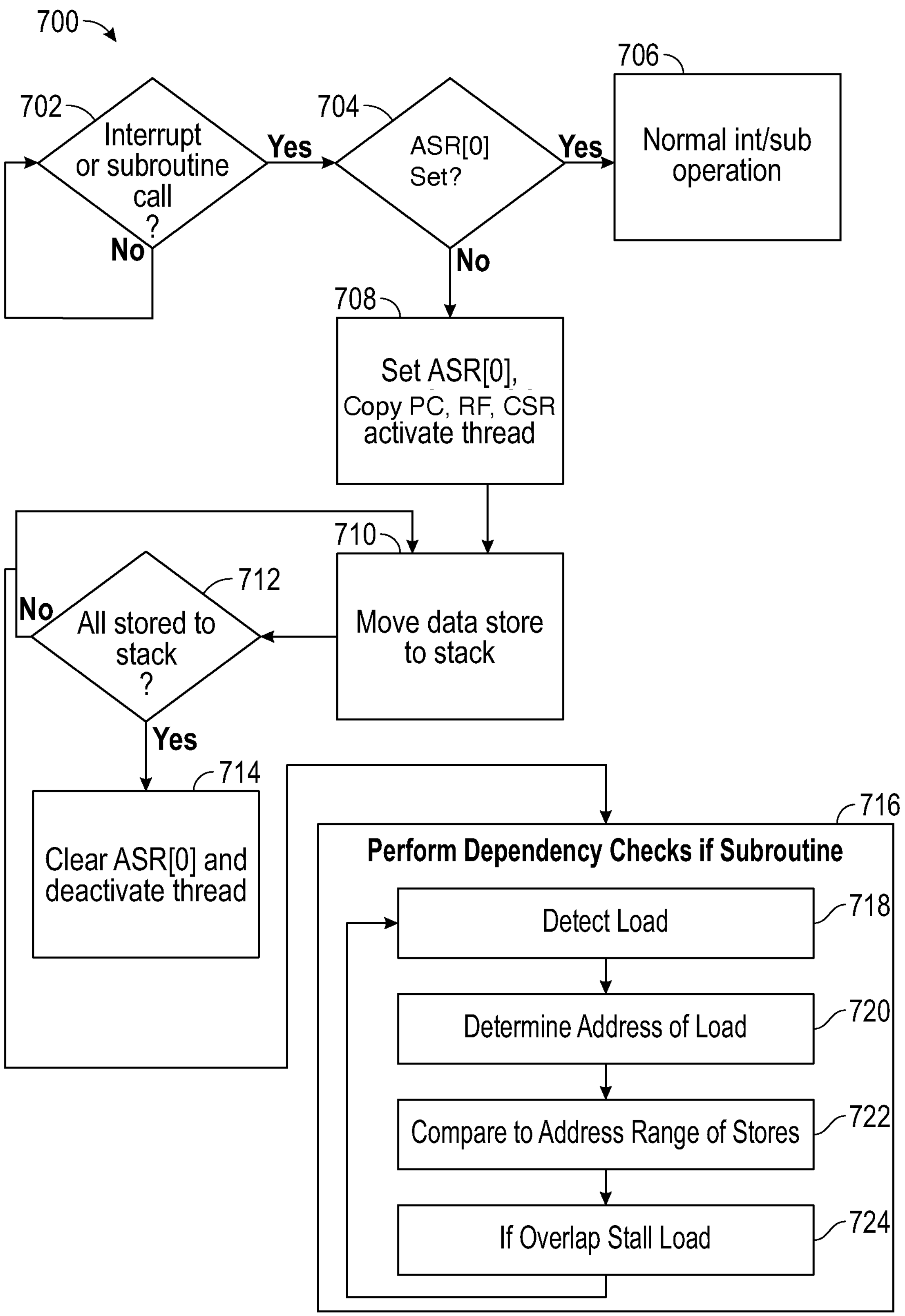
FIG. 7 is a flow chart showing an exemplary method, consistent with some embodiments.
Figure 9:
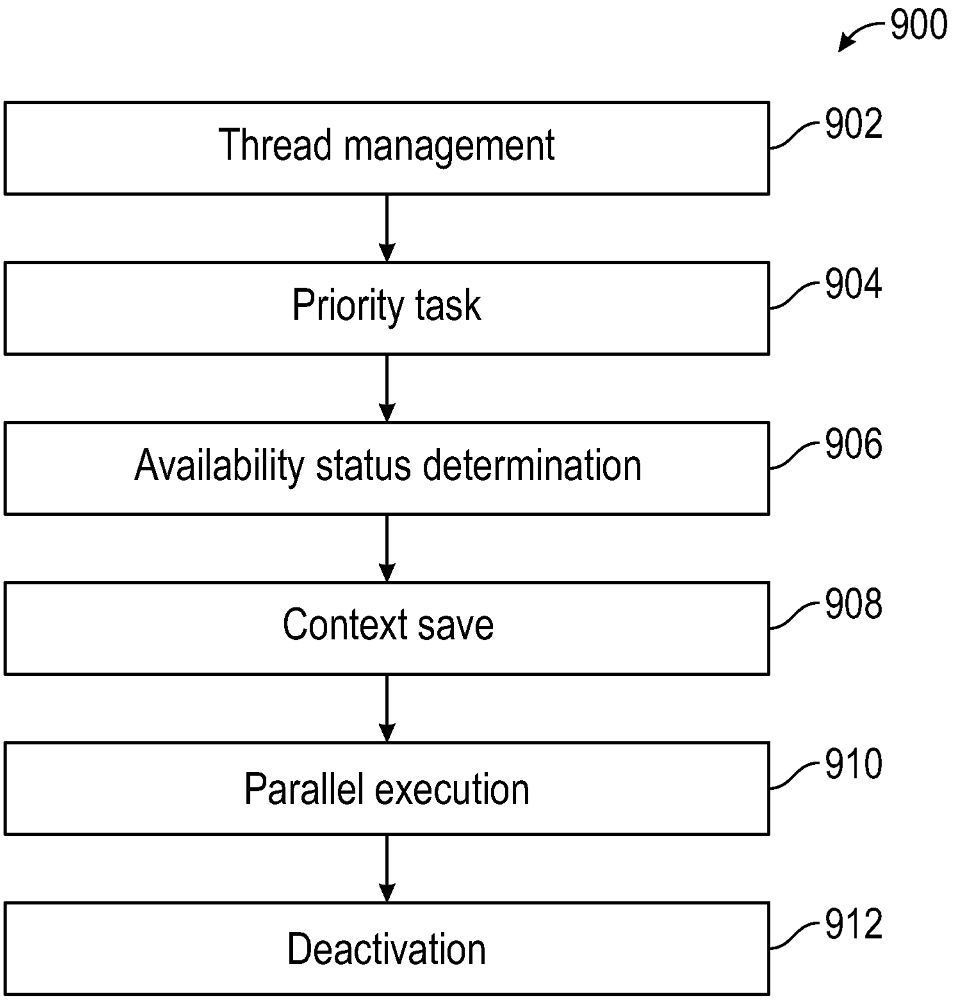
FIG. 9 is a flow chart showing an exemplary method, consistent with some embodiments.
Figure 10:
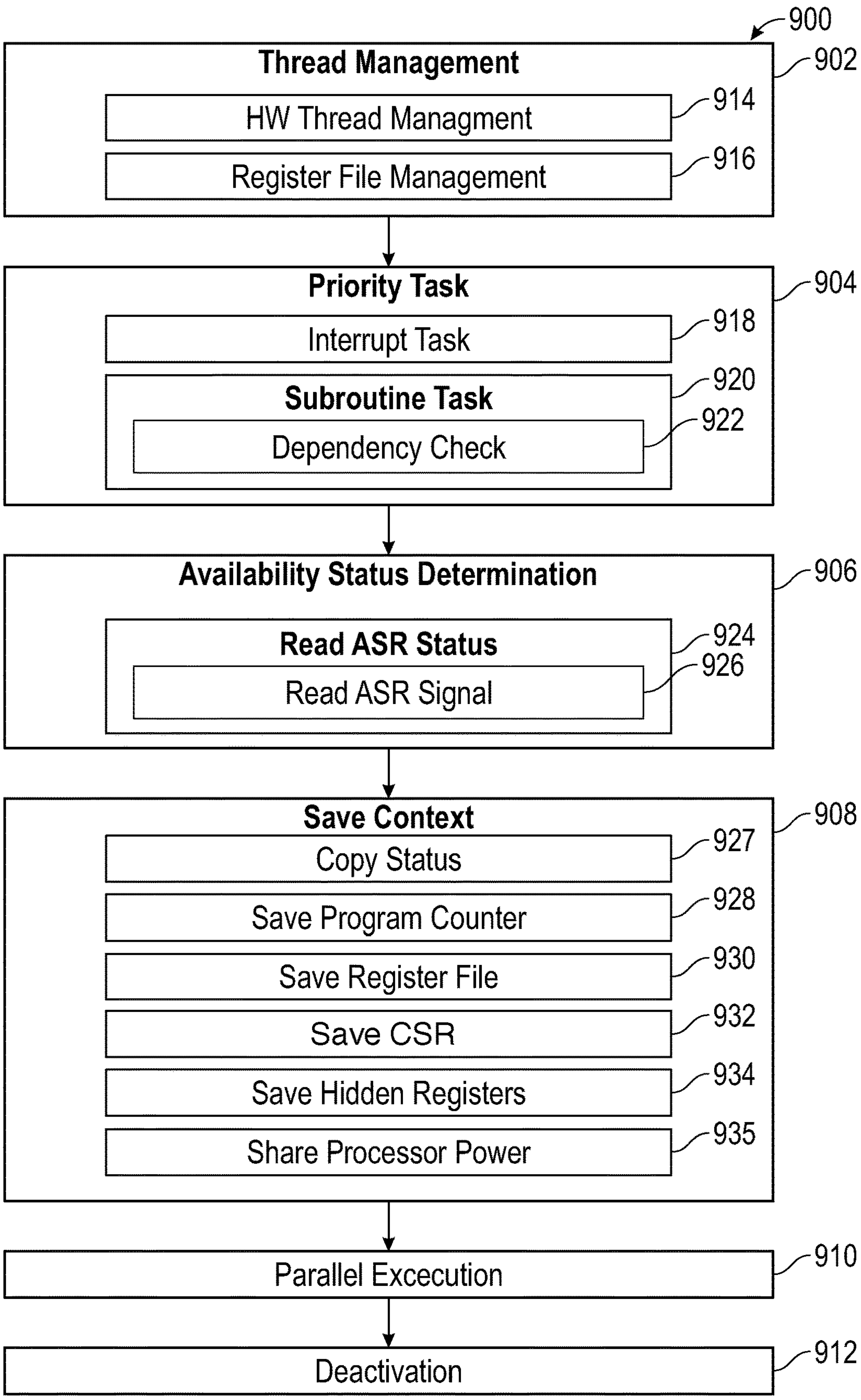
FIG. 10 is a flow chart showing the exemplary method of FIG. 9 with additional optional operations, consistent with some embodiments.

FIGS. 7 and 9-10 illustrate exemplary methods that are capable of being performed in one or more of the physical environments illustrated in other drawings. However, the exemplary methods are not limited to the disclosed physical environments and may be performed in a variety of other physical environments. In addition, although the exemplary methods have steps or operations that are illustrated as being performed in certain orders or sequences, it should be understood that at least some of the illustrated steps and orders may be performed in different orders or sequences or may be performed concurrently. Additionally, not all embodiments require all steps or operations, as will be apparent to those of skill in the art, some steps or operations are optional in some embodiments.

Referencing FIG. 7, an exemplary method 700 is performed in a computing environment that includes at least a first thread (e.g., thread 114) and a second thread (e.g. thread 116). Method 700 begins at operation 702 which determines if there is a priority task associated with the first thread, such as an interrupt or a subroutine call. If yes, then control moves to operation 704. If no, then a loop returns control back to operation 702 to again determine if there is a priority task associated with the first thread. That is, in some embodiments, operation 702 is a polling operation that repeated queries if there is a priority task associated with the first thread.

Operation 704, in some embodiments, determines if the second thread has an idle or other inactive availability status. In some embodiments, operation 704 determines the availability status of the second thread by checking an ASR associated with the second thread. In some further embodiments, operation 704 determines if an availability status bit indicates that the second thread is available. In yet further specific embodiments, the availability bit is ASR[0], and operation 704 determines if ASR[0] is 0, indicating an idle status for the second thread. If the second thread does not have an idle or other inactive availability status, the control moves to operation 706. If the second thread does have an idle or other inactive availability status, then control moves to operation 708.

Operation 706, in some embodiments, handles the interrupt or executes the subroutine in a conventional way without any additional resources. This is because operation 704 determined that no additional thread resources are available to the first thread to address the interrupt or subroutine.

Operation 708 activates the second thread, sets an availability status associated with the second thread as active, and copies state associated with the first thread for access by the second thread. In some embodiments, operation 708 sets the availability status of the second thread as employed, such as for example, by updating a status availability bit associated with the second thread. In some further embodiments, the availability bit is ASR[0], which is set to 1 to indicate that the second thread has an employed status. In some further embodiments, operation 708 copies the state of the first thread for access by the second thread, by copying content of a first register file associated with the first thread to a second register file associated with the second thread. In some specific embodiments, the content of the first register file includes at least one of a program counter for the first thread or an CSR for the first thread. In some specific embodiments, operation 708 activates the second thread after a program counter associated with the first thread is copied from the first register file to the second register file.

Operation 710 copies the state of the first thread to a stack in memory. In some embodiments, the state of the first thread is copied (e.g., written) from the second register file to the stack. In some embodiments, the performance of operation 710 overlaps with the performance of operation 708. For example, in operation 708, a first register may be copied from the first register file to the second register file. Then, the copying of the first register to the stack may commence while a second register is being copied from the first register file to the second register file. In some embodiments, operation 710 is performed at least in part with the state machine 600 of FIG. 6.

Operation 712 queries whether operation 710 is completed. That is, whether all of the state of the first thread has been stored to the stack. If yes, control moves to operation 714, which updates the availability status of the second thread to idle or to another inactive status and which deactivates the second thread, terminating method 700. In some embodiments, operation 714 updates the availability status of the second thread by updating one or more availability status bits in an ASR. In some further specific embodiments, the one or more availability status bits are an ASR[0] bit, which is set to 0 for inactive.

If the state of the first thread has not been completely stored to the stack, then operation 712 evaluates to no, and control returns to operation 710. Subsequently, or concurrently, control also moves to operation 716 which may perform a dependency check. In some embodiments, operation 716 is applicable if the priority task is a subroutine. In these embodiments, if the priority task is an interrupt, then operation 716 is not performed.

The dependency check of operation 716 optionally includes operations 718, 720, 722, and 724.

Operation 718 detects that the first thread, in performing the subroutine, it to execute a load operation. That is the first thread is about to read from a memory location. In some embodiments, operation 718 is performed at least partly with store buffer logic 466 and its associated logic 464, which detects a load operation.

Operation 720 determines one or more memory addresses which are to be read by the load operation. In some embodiments, operation 720 is performed with store buffer 466 and its associated logic 464.

Operation 722 compares the memory addresses to be read by the load operation with a range of memory addresses associated with the stack in which the state information of the first thread is being stored. In some specific embodiments, the comparison is only to memory addresses in the stack to which the second thread has not yet written state information. In these specific embodiments, the operation 722 uses more processor resources. In some embodiments, the operation 722 is performed at least partly with store buffer 466 and its associated logic 464.

Operation 724 stalls the load operation if there is an overlap between the one or more memory address to be read by the load operation and the address range associated with the stack. In some embodiments, the stall continues until operation 710 is completed. In other embodiments, the stall only continues until the second thread has finished writing to the one or more memory addresses associated with the load operation.

Figure 8:
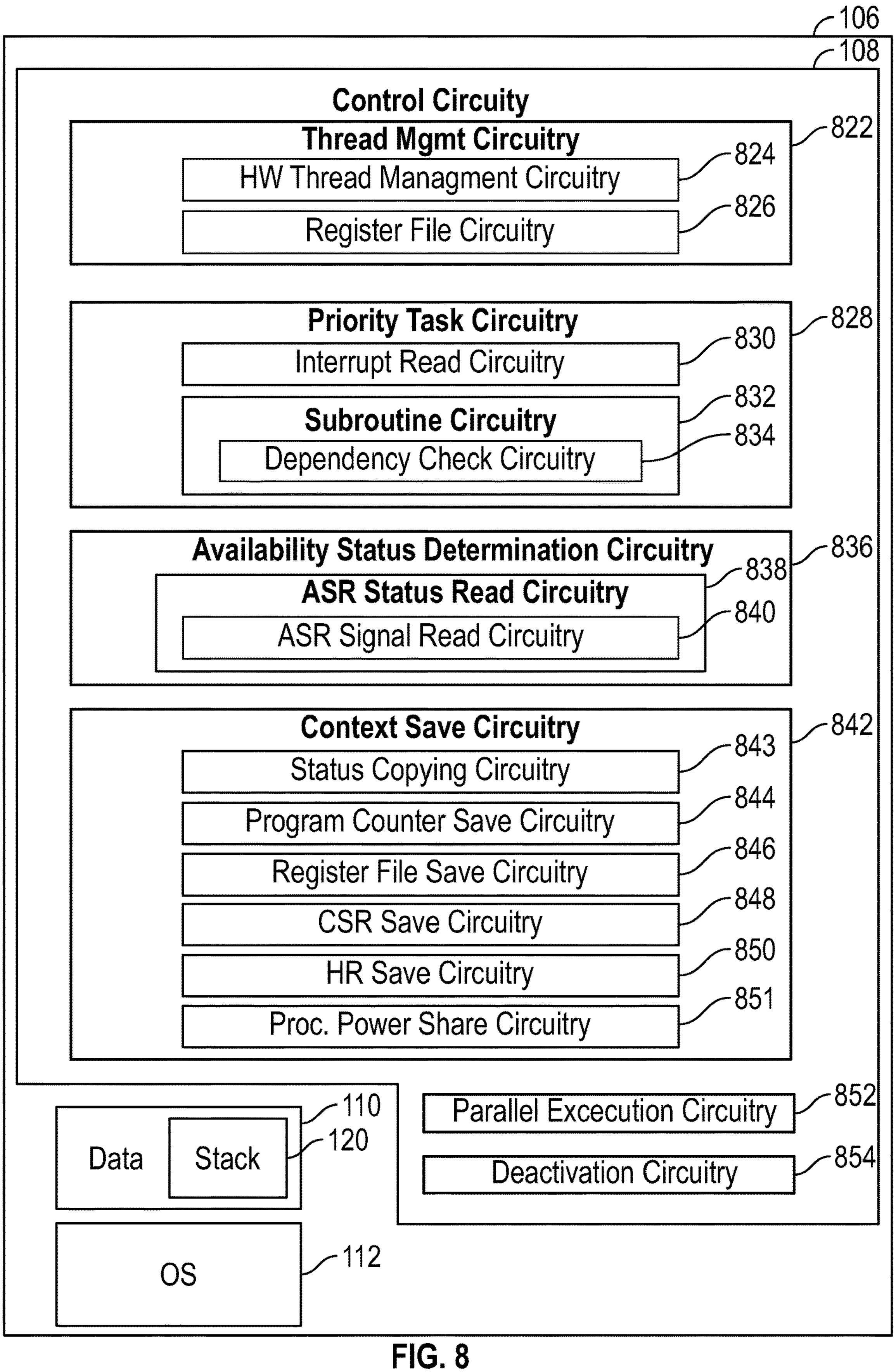
FIG. 8 is a simplified block diagram of a memory, consistent with some embodiments, showing circuitries, data, and an operating system.

Referencing FIG. 8, memory 106 of FIG. 1 is shown in greater detail. Consistent with some embodiments, memory 106 includes control circuitry 108, data 110 (including stack 110), and any operating system 112.

In some embodiments, control circuitry 108 is configured to perform one or more the operations referenced in FIGS. 9 and 10. Although control circuitry 108 is shown separate from the operating system 112, in some embodiments, there is some overlap between the control circuitry 108 and the operating system 112. For example, one or more circuitries internal to control circuitry 108 may be part of the operating system. Further, although memory 106 is shown as including one or more circuitries, not all embodiments will contain all the illustrated circuitries. In some embodiments, although the various circuitries are illustrated as being part of memory 106, in some embodiments, these circuitries are part of processor 104 or are separate logic.

In some embodiments, control circuitry 108 includes one or more of a thread management circuitry 822, a priority task circuitry 828, an availability status determination circuitry 836, a context save circuitry 842, a parallel execution circuitry 852, or a deactivation circuitry 854.

In some embodiments, thread management circuitry 822 optionally includes one or more of hardware thread management circuitry 824 or register file circuitry 826.

In some embodiments, priority task circuitry 828 optionally includes one or more of an interrupt read circuitry 830 or a subroutine circuitry 832. In some further embodiments, subroutine circuitry 832 optionally includes dependency check circuitry 834.

In some embodiments, availability status determination circuitry 836 optionally includes ASR status read circuitry 838. In some further embodiments, ASR status read circuitry 838 optionally includes ASR signal read circuitry 840.

In some embodiments, context save circuitry 842 optionally includes one or more of status copying circuitry 843, program counter save circuitry 844, register file save circuitry 846, CSR save circuitry 848, hidden register save circuitry 850 or processing power share circuitry 851.

Referencing FIG. 9, an exemplary method 900 is shown, consistent with some embodiments. Method 900 begins with operation 902 which manages a plurality of threads, the plurality of threads including at least (1) a first thread and (2) a second thread. In some embodiments, operation 902 is performed by thread management circuitry 822 (e.g., core 104A of processor 102 manages at least a first thread 114 and a second thread 116).

Control moves to operation 904 which causes the first thread to at least one of initiate or receive a priority task. In some embodiments, operation 904 is performed with priority task circuitry 828 (e.g., the first thread 114 initiating a subroutine and/or the first thread receiving an interrupt).

Control moves to operation 906 which, responsive to the priority task, determines an availability status of the second thread. In some embodiments, operation 906 is performed by availability status determination circuitry (e.g., core 104A checking an ASR associated with second thread 116 to determine an availability status of the second thread). In some further embodiments, the ASR indicates an availability status for the second thread of idle or active.

Control moves to operation 908 which, responsive to a determination that the second thread availability status is idle, copies at least some state associated with the first thread to one or more registers associated with the second thread, activates the second thread, and changes the availability status of the second thread from idle to active. In some embodiments, operation 908 is performed by the context save circuitry 842 (e.g. core 104A causing contents a register file associated with the first thread to be copied to a second register file associated with the second thread, core 104A activating the second thread, and/or causing the second thread 116 to update its ASR to indicate an active or employed status).

Control moves to operation 910, which at least partly performs the following tasks at least one of concurrently or simultaneously: (1) copying the at least some state from the one or more registers associated with the second thread to a stack in memory; and (2) performing the priority task at least in part with the first thread. In some embodiments, operation 910 is performed by parallel execution circuitry 852 (e.g., core 104A causing the second thread 116 to store the state of the first thread 114 to a stack in memory while also causing the first thread 114 to either execute a subroutine or execute an interrupt handling service).

Control moves to operation 912, which, responsive to completion of the copying the at least some state from the one or more registers associated with the second thread to a stack in memory, deactivates the second thread and changes the availability status of the second thread to idle. In some embodiments, operation 912 is performed at least in part with deactivation circuitry 854 (e.g., core 104A causing the second thread 116 to update its ASR[0] bit to 0 and to go inactive).

Referencing FIG. 10, in some embodiments, operation 902 optionally includes one or more of operation 914 or 916. And, in some embodiments, operation 904 optionally includes one or more of operation 918 or 920. And, in some embodiments, operation 906 optionally includes operation 924. And, in some embodiments, operation 908 optionally includes one or more operations 927, 928, 930, 932, 934 or 935.

Operation 914 manages the plurality of threads (e.g., of operation 902), the plurality of threads including at least a plurality of hardware threads. In some embodiments, operation 914 is performed at least in part with hardware thread management circuitry 824 (e.g., core 104A managing threads 114 and 116, which are implemented with dedicated hardware, such as for example, register files).

Operation 916 manages a plurality of threads (e.g., of operation 902) that include at least a first thread associated with a first register file, a second thread associated with a second register file, a third thread associated with a third register file, and a fourth thread associated with a fourth register file. The register files being configured for the second register file to receive values from the first register file, the third register file to receive values from the second register file, the fourth register file to receive values from the third register file, and first register file to receive values from the fourth register file. In some embodiments, operation 916 is implemented at least in part with register file circuitry 826. In some embodiments, the register file circuitry 826 includes at least a processor core and the hardware support for the plurality of threads (e.g., register files).

Operation 918 causes the first thread to receive an interrupt. In some embodiments, operation 918 is performed at least in part with interrupt read circuitry 830.

Operation 920 causes the first thread to make at least a subroutine call. In some embodiments, operation 920 is performed at least in part with subroutine circuitry 832.

In some embodiments, operation 920 optionally includes operation 922. Operation 922 causes the second thread to perform one or more checks for one or more data dependencies between data associated with the first thread and data (e.g., state of the first thread) to be copied to memory (e.g. to a stack) by the second thread. In some embodiments, operation 922 is performed at least in part with dependency check circuitry 834 (e.g., store buffer 466 and its associated logic 464 checking data to be accessed by a load operation by the first thread against memory addresses associated with the stack).

Operation 924 determines the availability status of the second thread by reading one or more bits of an ASR register associated with the second thread. In some embodiments, operation 924 is performed at least in part with ASR status read circuitry 838 (e.g., second thread reading availability status bit 542 of ASR 540).

In some embodiments, operation 924 optionally includes operation 926. Operation 926 additionally reads one or more other bits of the ASR register to determine one or more registers associated with the first thread whose content is to be copied. In some embodiments, operation 926 is performed at least in part with ASR signal read circuitry 840 (e.g., second thread reading register save bits 544 of ASR 540).

Operation 927 copies the at least some state associated the first thread from one or more register files associated with the first thread to one or more register files associated with the second thread. In some embodiments, operation 927 is performed at least in part with status copying circuitry 843 (e.g. core 104A causing second thread 116 to read from read ports 456 to read state of first thread 114 from a first register file 450A and to write that state via write ports 458 to the second register file 450A associated with the second thread 116).

Operation 928 copies at least a program counter associated with the first thread for access by the second thread. In some embodiments, operation 928 is performed at least in part with program counter save circuitry 844 (e.g., the first thread causing its program counter to be copied to its register file for copying to a second register file associated with the second thread).

Operation 930 copies at least some content of a register file associated with the first thread for access by the second thread. In some embodiments, operation 930 is performed at least in part with register file save circuitry 846 (e.g., core 104A causing a first register file to be read at least partly via one or more read ports and causing a second register file to be written to at least partly via one or more write ports).

Operation 932 copies at least content of a control status register (CSR) associated with the first thread for access by the second thread. In some embodiments, operation 932 is performed at least in part with CSR save circuitry 848 (e.g., the first thread causing its CSR to be copied to its register file for copying to a second register file associated with the second thread).

Operation 934 copies at least content of one or more hidden registers associated with the first thread for access by the second thread. In some embodiments, operation 934 is performed at least in part with hidden register save circuitry 850 (e.g., the first thread causing one or more of its hidden registers to be copied to its register file for copying to a second register file associated with the second thread).

Operation 935 provides a portion of processing power associated with the first thread to the second thread. In some embodiments, operation 935 is performed at least in part with processing power share circuitry 851 (e.g., a first thread 114 which is receiving 50 percent of processing power shares half of that processing power with an employed second thread 116).

Some embodiments are now discussed.

In some embodiments, a computing device, the computing device includes at least one or more processors that are configured with at least one of processor-executable instructions or processor-executable micro-code (for example, without limitation, processor 102 configured with state machine 146 and micro-code 148 and with control circuitry 108, processor 200 configured with access to instruction memory 242 and microcode 248 generated by state machine 246, decode stage 226 configured to receive microcode 248 from state machine 246 and instructions from fetch stage 224, etc.) that configure the one or more processors to perform a method that includes at least:

- managing a plurality of threads that includes at least a first thread and a second thread;
- causing the first thread to receive a priority task;
- responsive to the priority task, determining an availability status of the second thread, the availability status being at least one of active or idle;
- responsive to a determination that the second thread activity status is idle, copying state associated with the first thread for use by the second thread, activating the second thread, and changing the availability status of the second thread from idle to active;
- performing the priority task at least in part with the second thread; and
- responsive to completion of the priority task, deactivating the second thread and changing the availability status of the second thread from active to idle.

It will be understood by those skilled in the art that the terminology used in this specification and in the claims is "open" in the sense that the terminology is open to additional elements not enumerated. For example, the word "includes" should be interpreted to mean "including at least" and so on. Even if "includes at least" is used sometimes and "includes" is used other times, the meaning is the same: includes at least. The word "comprises" is also "open" regardless of where in a claim it is used. In addition, articles such as "a" or "the" should be interpreted as not referring to a specific number, such as one, unless explicitly indicated. At times a convention of "at least one of A, B, or C" is used, the intent is that this language includes any combination of A, B, C, including, without limitation, any of A alone, B alone, C alone, A and B, B and C, A and C, all of A, B, and C or any combination of the foregoing, such as for example AABBC, or ABBBCC. The same is indicated by the conventions "one of more of A, B, or C" and "and/or".

In addition, references to circuits, refer to circuitry for causing a device to perform the respective functions of these circuits. In some embodiments, these circuits include at least one of executable code stored on a machine-readable medium, an application, a field-programmable gate array (FPGA), an application-specific integrated circuit (ASIC), memories storing executable code, other forms of logic or any combination of the foregoing. In some embodiments, these circuits include are part of and/or include a link to a multi-threaded processor. In embodiments in which one or more circuits includes executable code stored in a machine-readable medium, this executable code, when executed, would cause the multi-threaded processor to perform the respective functions of the circuit. Consistent with the above discussion, in some embodiments, these circuits may be part of a processing device, such as a central processing unit (CPU), a processor, a controller, a field-programmable gate array, a graphics accelerator, a graphics processing unit (GPU), or hard-wired logic, such as for example an application-specific integrated circuit (ASIC). In some embodiments one or more circuits may contain memory, may be configured to access stored memory, may be configured to access remote memory, or may not contain or access memory, dependent on their function. In some embodiments, one or more circuits contain or are linked to one or more machine-readable mediums.

Although embodiments have been described in detail, it should be understood that various changes, substitutions, and alterations could be made hereto without departing from the spirit and scope of the invention as defined by the appended claims and equivalents thereof.

I claim:

1. A computing device includes a single multi-threaded processor that is configured to execute a plurality of threads on the single multi-threaded processor, the computing device comprising:

thread management circuitry configured for managing the plurality of threads, the plurality of threads including at least (1) a first thread and (2) a second thread, the thread management circuitry comprising a circular thread register containing only active thread identifiers and issuing a canonical sequence of thread identifiers, each thread identifier corresponding to a particular thread, each particular thread having an associated availability status register (ASR) including a thread idle or thread busy bit, and also save bits indicating a range of registers to copy;

priority task circuitry configured for causing the first thread to at least one of initiate or receive a priority task;

availability status determination circuitry associated with each said ASR and configured for, responsive to the priority task, determining an availability status of the second thread;

context save circuitry configured for, responsive to a determination that the second thread availability status is idle, copying at least some state associated with the first thread to one or more registers associated with the second thread, said at least some state including a range of registers indicated by the save bits, activating the second thread, and changing the availability status of the second thread from idle to active;

parallel execution circuitry configured for at least partly performing the following tasks at least one of concurrently or simultaneously: (1) copying from the one or more registers associated with the second thread to a stack in memory; and (2) performing the priority task at least in part with the first thread; and deactivation circuitry configured for, responsive to completion of the copying the at least some state from the one or more registers associated with the second thread to a stack in memory, deactivating the second thread and changing the availability status of the second thread to idle.

2. The computing device of claim 1, further comprising circuitry configured for, responsive to a determination that the second thread availability status is active, not copying at least some state associated with the first thread, as identified by the ASR save bits associated with the second thread, to one or more registers associated with the second thread.

3. The computing device of claim 1, wherein the context save circuitry configured for, responsive to a determination that the second thread availability status is idle, copying at least some state associated with the first thread to one or more registers associated with the second thread, activating the second thread, and changing the availability status of the second thread from idle to active comprises:

status copying circuitry for copying the at least some state associated the first thread from one or more register files associated with the first thread to one or more register files associated with the second thread.

4. The computing device of claim 1, wherein the at least one multi-threaded processor is at least one of:

a fine-grain multi-threaded processor; a microcontroller, a microprocessor, an embedded processor, a digital signal processor (DSP), a media processor, a graphics processing unit (GPU), a reduced instruction set computer (RISC), a complex instruction set computer (CISC), and a minimal instruction set computer (MISC)

(2).

5. The computing device of claim 1, wherein the thread management circuitry configured for managing the plurality of threads, the plurality of threads including at least a first thread and a second thread comprises:

hardware thread management circuitry configured for managing the plurality of threads, the plurality of threads including at least a plurality of hardware threads.

6. The computing device of claim 1, wherein the at least one multi-threaded processor causes the plurality of threads to change threads once per clock cycle.

7. The computing device of claim 1, wherein the thread management circuitry configured for managing the plurality of threads, the plurality of threads including at least a first thread and a second thread comprises:

register file circuitry configured for managing a plurality of threads that include at least a first thread associated with a first register file, a second thread associated with a second register file, a third thread associated with a third register file, and a fourth thread associated with a fourth register file; and wherein the second register file is configured to receive values from the first register file, the third register file is configured to receive values from the second register file, the fourth register file is configured to receive values from the third register file, and first register file is configured to receive values from the fourth register file.

8. The computing device of claim 1, wherein the context save circuitry configured for, responsive to a determination that the second thread activity status is idle, copying state associated with the first thread for use by the second thread, activating the second thread, and changing the availability status of the second thread from idle to active comprises:

program counter save circuitry configured for copying at least a program counter associated with the first thread for access by the second thread.

9. The computing device of claim 1, wherein the context save circuitry configured for, responsive to a determination that the second thread activity status is idle, copying state associated with the first thread for use by the second thread, activating the second thread, and changing the availability status of the second thread from idle to active comprises:

register file save circuitry configured for copying at least some content of a register file associated with the first thread for access by the second thread.

10. The computing device of claim 1, wherein the context save circuitry configured for, responsive to a determination that the second thread activity status is idle, copying state associated with the first thread for use by the second thread, activating the second thread, and changing the availability status of the second thread from idle to active comprises:

Control Status Register (CSR) save circuitry configured for copying at least content of a CSR associated with the first thread for access by the second thread.

11. The computing device of claim 1, wherein the context save circuitry configured for, responsive to a determination that the second thread activity status is idle, copying state associated with the first thread for use by the second thread, activating the second thread, and changing the availability status of the second thread from idle to active comprises:

hidden register save circuitry configured for copying at least content of one or more hidden registers associated with the first thread for access by the second thread.

12. The computing device of claim 1, where the availability status determination circuitry configured for, responsive to the priority task, determining an availability status of the second thread comprises:

ASR status read circuitry configured for determining the availability status by reading one or more bits of an ASR register associated with the second thread.

13. The computing device of claim 12, wherein the ASR status read circuitry configured for determining the availability status by reading one or more bits of an ASR register associated with the second thread further comprises:

ASR signal read circuitry configured for additionally reading one or more other bits of the ASR register to determine one or more registers associated with the first thread whose content is to be copied.

14. The computing device of claim 1, wherein at least the first thread and the second thread have respective states that include at least one of a program counter, a register file, or a control status register (CSR).

15. The computing device of claim 1, wherein the priority task circuitry configured for causing the first thread to at least one of initiate or receive a priority task method comprises:

interrupt receive circuitry configured for causing the first thread to receive an interrupt.

16. The computing device of claim 1, wherein the priority task circuitry configured for causing the first thread to at least one of initiate or receive a priority task method comprises:

subroutine call circuitry configured for causing the first thread to make at least a subroutine call.

17. The computing device of claim 16, wherein the subroutine call circuitry configured for causing the first thread to make at least one of a function call or a subroutine call comprises:

dependency check circuitry configured for causing the second thread to perform one or more checks for one or more data dependencies between data associated with the first thread and data to be copied to memory by the second thread.

18. The computing device of claim 1, wherein the context save circuitry configured for, responsive to a determination that the second thread activity status is idle, copying state associated with the first thread for use by the second thread, activating the second thread, and changing the availability status of the second thread from idle to active further comprises:

processing power share circuitry configured for providing a portion of processing power associated with the first thread to the second thread.

19. A computing device, the computing device comprises:

a single processor that is configured with at least one of processor-executable instructions or processor-executable microcode that configure the single processor to perform a method that includes at least:

managing a plurality of threads that includes at least a first thread and a second thread, the plurality of threads managed using a thread register containing thread identifiers and indicating a canonical sequence of only active threads;

causing the first thread to receive a priority task;

responsive to the priority task, determining an availability status of the second thread using an availability status bit of an availability status register (ASR) associated with the second thread by thread identifier, the availability status being at least one of said active or idle;

responsive to a determination that the second thread activity status is idle, copying a plurality of registers determined by register save bits of the first thread ASR, the plurality of registers associated with the first thread for use by the second thread, activating the second thread, and changing an availability status bit of the second thread ASR from idle to active;

performing the priority task at least in part with the second thread; and responsive to completion of the priority task, deactivating the second thread and changing the availability status bit of the second thread from active to idle.

20. A method implemented with a computing device, the method comprising:

with at least a single processor core of a fine grained, multi-threaded processor, managing a plurality of threads that includes at least a first thread and a second thread, the at least first thread and the second thread associated with thread identifiers in a thread register issuing a canonical sequence of thread identifiers, each thread identifier associated with an availability status register (ASR) having an availability status bit set to active;

causing the first thread to receive a priority task;

responsive to the priority task, determining an availability status of the second thread using the associated second thread ASR, the availability status being at least one of active or idle;

responsive to a determination that the second thread activity status is idle, copying state associated with the first thread for use by the second thread, activating the second thread by including its thread identifier in the thread register, and changing the availability status bit of the second thread from idle to active, the state associated with the first thread comprising at least a plurality of registers, the plurality of registers determined by register save bits of the associated ASR;

performing the priority task at least in part with the second thread; and responsive to completion of the priority task, deactivating the second thread and changing the availability status bit of the second thread from active to idle.

* * * * *